US010365920B2

(12) United States Patent
Stenfort et al.

(10) Patent No.: US 10,365,920 B2
(45) Date of Patent: *Jul. 30, 2019

(54) MANAGEMENT OF DEVICE FIRMWARE UPDATE EFFECTS AS SEEN BY A HOST

(71) Applicant: Seagate Technology LLC, Cupertino, CA (US)

(72) Inventors: Ross John Stenfort, Los Altos, CA (US); Keith Patrick McKay, Milpitas, CA (US)

(73) Assignee: Seagate Technology LLC, Cupertino, CA (US)

(*) Notice: Subject to any disclaimer, the term of this patent is extended or adjusted under 35 U.S.C. 154(b) by 4 days.

This patent is subject to a terminal disclaimer.

(21) Appl. No.: 15/686,221

(22) Filed: Aug. 25, 2017

(65) Prior Publication Data
US 2018/0004504 A1 Jan. 4, 2018

Related U.S. Application Data

(63) Continuation of application No. 14/964,139, filed on Dec. 9, 2015, now Pat. No. 9,766,878, which is a (Continued)

(51) Int. Cl.
G06F 8/65 (2018.01)
G06F 9/445 (2018.01)
G06F 8/654 (2018.01)

(52) U.S. Cl.
CPC ............ G06F 8/65 (2013.01); G06F 8/654 (2018.02); G06F 9/445 (2013.01); Y02D 10/42 (2018.01)

(58) Field of Classification Search
CPC .................................................. G06F 8/60–78
(Continued)

(56) References Cited

U.S. PATENT DOCUMENTS 6,240,470 B1 * 5/2001 Murayama ............ G06F 3/0626
710/1
6,754,723 B2 * 6/2004 Kato ........................ G06F 8/65
709/217
(Continued)

FOREIGN PATENT DOCUMENTS

| CN | 1438568 | 8/2003 |
| CN | 101046749 | 10/2007 |
| WO | 2012170521 | 12/2012 |

OTHER PUBLICATIONS

"Firmware Update Management Object"—Open Mobile Alliance—Candidate Version 1.0—Jun. 15, 2006.*
(Continued)

Primary Examiner — Francisco J Aponte
(74) Attorney, Agent, or Firm — Taylor English Duma LLP

(57) ABSTRACT

The present disclosure relates to systems and methods of device firmware update effects as seen by a computing host. In one example implementation according to aspects of the present disclosure, a method includes executing a first firmware received from a computing host, the first firmware including a first firmware revision identifier, executing a second firmware received from the computing host, and returning the first firmware revision identifier to the computing host during the execution of the second firmware and before an event occurs. The returning the first firmware revision identifier enables the computing host to continue executing without detecting an error in response to a change in a value of a returned firmware revision identifier throughout the execution of the first firmware and during execution of the second firmware.

14 Claims, 4 Drawing Sheets

Related U.S. Application Data continuation of application No. 14/119,375, filed as application No. PCT/US2012/041088 on Jun. 6, 2012, now Pat. No. 9,223,563.

(60) Provisional application No. 61/494,262, filed on Jun. 7, 2011.

(58) Field of Classification Search
USPC .................................................. 717/168–178
See application file for complete search history.

(56) References Cited

U.S. PATENT DOCUMENTS

| | | | | |
|---|---|---|---|---|
| 7,975,084 | B1* | 7/2011 | Kalbarga | G06F 13/102 |
| | | | | 710/104 |
| 8,250,246 | B2* | 8/2012 | Brockmann | G06F 8/656 |
| | | | | 710/14 |
| 8,694,989 | B1* | 4/2014 | Carlson | G06F 9/45537 |
| | | | | 717/174 |
| 9,274,789 | B2* | 3/2016 | Yuan | G06F 8/656 |
| 10,101,988 | B2* | 10/2018 | Ford | G06F 8/654 |
| 2003/0131083 | A1* | 7/2003 | Inui | G06F 8/65 |
| | | | | 709/221 |
| 2004/0255286 | A1* | 12/2004 | Rothman | G06F 8/65 |
| | | | | 717/168 |
| 2006/0031664 | A1* | 2/2006 | Wilson | G06F 8/65 |
| | | | | 713/1 |
| 2006/0136900 | A1* | 6/2006 | Kim | G06F 8/65 |
| | | | | 717/168 |
| 2007/0016901 | A1* | 1/2007 | Izuta | G06F 8/65 |
| | | | | 717/168 |
| 2008/0028385 | A1* | 1/2008 | Brown | G06F 8/65 |
| | | | | 717/170 |
| 2008/0040713 | A1* | 2/2008 | Subbakrishna | G06F 8/65 |
| | | | | 717/173 |
| 2009/0178033 | A1* | 7/2009 | Challener | G06F 9/4411 |
| | | | | 717/168 |
| 2009/0254898 | A1* | 10/2009 | Sareen | G06F 8/61 |
| | | | | 717/174 |
| 2009/0313527 | A1* | 12/2009 | Stenfort | G06F 11/0727 |
| | | | | 714/758 |
| 2010/0011134 | A1* | 1/2010 | Brockmann | G06F 8/656 |
| | | | | 710/14 |
| 2010/0042984 | A1* | 2/2010 | Daftardar | G06F 8/65 |
| | | | | 717/168 |
| 2010/0199272 | A1* | 8/2010 | Mahajan | G06F 11/2023 |
| | | | | 717/171 |
| 2011/0131447 | A1* | 6/2011 | Prakash | G06F 21/572 |
| | | | | 714/19 |
| 2011/0276724 | A1* | 11/2011 | Mullis, II | G06F 9/4415 |
| | | | | 710/8 |
| 2012/0110562 | A1* | 5/2012 | Heinrich | G06F 8/65 |
| | | | | 717/169 |
| 2013/0268922 | A1* | 10/2013 | Tiwari | G06F 9/4411 |
| | | | | 717/168 |

OTHER PUBLICATIONS

"System Firmware Updates Utilizing Sofware Repositories"—Matt Domsch, Michael Brown—Dell—2006 Linux Symposium, vol. One.*

LSI Corporation; Chinese Office Action for serial No. 2012800310492, filed Jun. 6, 2012, dated Feb. 2, 2015, 15 pgs.

Stenfort, Ross John; International Preliminary Report on Patentability for PCT/US2012/041088, filed Jun. 6, 2012, dated Dec. 10, 2012, 5 pgs.

Stenfort, Ross John; International Search Report and Written Opinion for PCT/US2012/041088, filed Jun. 6, 2012, dated Jan. 2, 2013, 7 pgs.

LSI Corporation; Office Action for Chinese patent application No. 201510419234.4, filed Jun. 6, 2012, dated Sep. 13, 2018, 24 pgs.

LSI Corporation; Office Action for Chinese patent application No. 201510419234.4, filed Jun. 6, 2012, dated Dec. 29, 2017, 28 pgs.

* cited by examiner

MANAGEMENT OF DEVICE FIRMWARE UPDATE EFFECTS AS SEEN BY A HOST

CROSS REFERENCE TO RELATED APPLICATIONS

This application is a continuation of U.S. patent application Ser. No. 14/964,139, filed Dec. 9, 2015, which is a continuation of U.S. patent application Ser. No. 14/119,375, filed Nov. 21, 2013, which is a National Stage Entry of PCT/US2012/04188, filed Jun. 6, 2012, which claims the benefit of U.S. Provisional Application No. 61/494,262, filed Jun. 7, 2011, all of which are hereby incorporated by reference in their entireties.

BACKGROUND

Field: Advancements in storage technology are needed to provide improvements in performance, efficiency, and utility of use.

Related Art: Unless expressly identified as being publicly or well known, mention herein or techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may he implemented in numerous ways, e.g. as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

List of Reference Symbols in Drawings

Figure 1A:
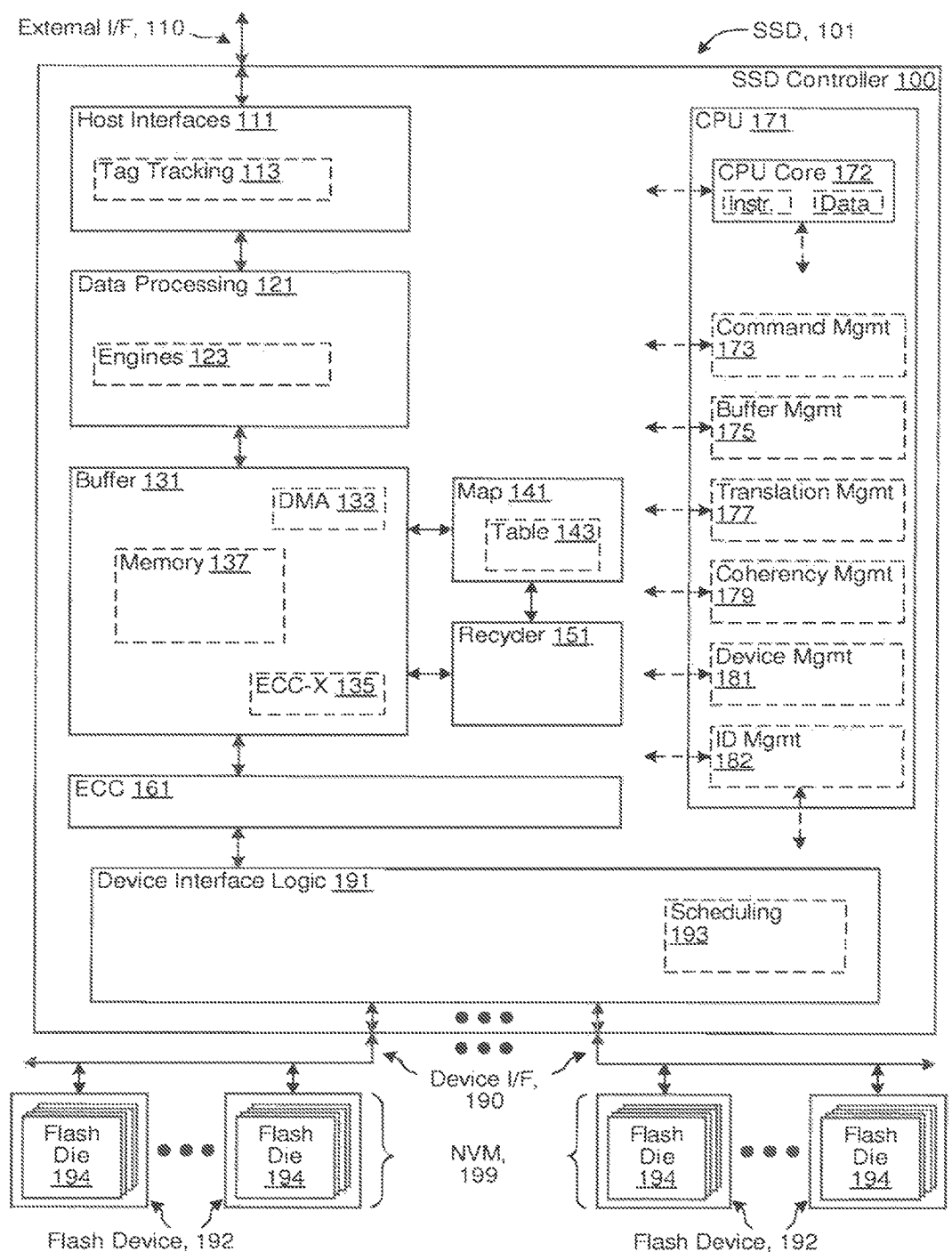
FIG. 1A illustrates selected details of an embodiment of a Solid-State Disk (SSD) including an SSD providing management of device firmware update effects as seen by a host.

| Ref. Symbol | Element Name |
|---|---|
| 100 | SSD controller |
| 101 | SSD |
| 102 | host |
| 103 | intermediate controller |
| 104 | intermediate interfaces |
| 105 | OS |
| 106 | firmware storage |
| 107 | select ID information storage |
| 110 | external interfaces |
| 111 | host interface |
| 113 | tag tracking |
| 121 | data processing |
| 123 | engines |
| 131 | buffer |
| 133 | DMA |
| 135 | ECC-X |
| 137 | memory |
| 141 | map |
| 143 | table |
| 151 | recycler |
| 161 | ECC |
| 171 | CPU |
| 172 | CPU core |
| 173 | command management |
| 175 | buffer management |
| 177 | translation management |
| 179 | coherency management |
| 181 | device management |
| 182 | identity management |
| 190 | device interfaces |
| 191 | device interface logic |
| 192 | flash devices |
| 193 | scheduling |
| 194 | flash die |
| 199 | NVM |
| 200 | flow diagram |
| 201 | Operate (old) firmware (old) ID info |
| 201D | Download Command |
| 202 | Download (new) firmware |
| 203 | Protect Select ID info |
| 203A | Activate Command |
| 204 | Activate (new) firmware |
| 205 | Device Boot |
| 206 | Operate (new) firmware (old) ID info |
| 206P | Power Cycle |
| 207 | UnProtect Select ID info |
| 208 | Device Boot |
| 209 | Operate (new) firmware (new) ID info |
| 300 | flow diagram |
| 301 | Operate (old) firmware (old) ID info |
| 301R | Read ID Command |
| 302 | Provide Select ID Info |
| 302D | Download Command |
| 303 | Download (new) firmware |
| 303A | Activate Command |
| 304 | Activate (new) firmware |
| 305 | Device Boot |
| 305W | Write ID Command |
| 306 | Receive Select ID Info |
| 307 | Operate (new) firmware (old) ID info |
| 307P | Power Cycle |
| 308 | Discard Select ID Info |
| 309 | Device Boot |
| 310 | Operate (new) firmware (new) ID info |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of sonic operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description: the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.
Acronyms
At least some of the various shorthand abbreviations (e.g. acronyms) defined here refer to certain elements used herein.

| Acronym | Description |
| --- | --- |
| AES | Advanced Encryption Standard |
| AHCI | Advanced Host Controller Interface |
| ASCII | American Standard Code for Information Interchange |
| ATA | Advanced Technology Attachment (AT Attachment) |
| BCH | Bose Chaudhuri Hocquenghem |
| CD | Compact Disk |
| CF | Compact Flash |
| CMOS | Complementary Metal Oxide Semiconductor |
| CPU | Central Processing Unit |
| CRC | Cyclic Redundancy Check |
| DDR | Double-Data-Rate |
| DES | Data Encryption Standard |
| DMA | Direct Memory Access |
| DVD | Digital Versatile/Video Disk |
| ECC | Error-Correcting Code |
| eSATA | external Serial Advanced Technology Attachment |
| FUA | Force Unit Access |
| HBA | Host Bus Adapter |
| HDD | Hard Disk Drive |
| IC | Integrated Circuit |

-continued

| Acronym | Description |
| --- | --- |
| IDE | Integrated Drive Electronics |
| JPEG | Joint Photographic Experts Group |
| LBA | Logical Block Address |
| LDPC | Low-Density Parity-Check |
| LPN | Logical Page Number |
| LZ | Lempel-Ziv |
| MLC | Multi-Level Cell |
| MMC | MultiMediaCard |
| MPEG | Moving Picture Experts Group |
| NCQ | Native Command Queuing |
| NVM | Non-Volatile Memory |
| OEM | Original Equipment Manufacturer |
| ONFI | Open NAND Flash Interface |
| OS | Operating System |
| PC | Personal Computer |
| PCIe | Peripheral Component Interconnect express (PCI express) |
| PDA | Personal Digital Assistant |
| PHY | PHYsical interface |
| RAID | Redundant Array of Inexpensive/Independent Disks |
| ReRAM | Resistive Random Access Memory |
| RS | Reed-Solomon |
| RSA | Rivest, Shamir & Adleman |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SLC | Single-Level Cell |
| SMART | Self-Monitoring Analysis and Reporting Technology |
| SPB | Secure Physical Boundary |
| SSD | Solid-State Disk/Drive |
| SSP | Software Settings Preservation |
| USB | Universal Serial Bus |
| VPD | Vital Product Data |

Management of device firmware update effects as seen by a computing host enables continuously running an OS on the host across a device firmware update, e.g., via delaying visibility of at least a portion of effects of the firmware update, such as in a context that without the delay in visibility the OS would encounter an unrecoverable error and "crash". For example, a device (e.g. a SATA-compatible SSD) is coupled to a computing host running an unmodified version of Windows. Firmware on the device is updated and activated, such as by being booted and/or by one or more libraries and/or tables being made accessible to executing firmware. Visibility of a portion of information that would otherwise become immediately visible to the OS (upon activation of the updated firmware) is delayed until a power cycle of the device. If the portion includes, e.g., a firmware revision identifier, then the delayed visibility enables continuously running the OS across the firmware update/activation without rebooting the OS.

Firmware of a device is updated, and one or more effects of the firmware update are optionally managed as seen by a computing host, such as via delaying visibility of at least a portion of effects of the update to an OS running on the host and accessing the device. The delaying continues until a specific event occurs that ends the visibility delaying. Examples of the specific event are: the device being power cycled (e.g. removal and then reapplication of power), all or any portions of the device transitioning from one power mode to another (e.g. exiting a sleep mode or a PHY power management mode), the device receiving a vendor specific command, the device receiving a particular parameter and/or code as part of a firmware update, and a reset of a link coupling the device to a host. Mode information of the device (e.g. accessible by the host via a command to the device) optionally selectively determines which of the aforementioned example events correspond to events that end delaying of visibility.

For example, the device is a SATA compatible SSD having a controller with firmware that is updated. Visibility of the portion of the update that provides a firmware revision identifier is delayed until the SSD is power cycled. Thus until the device is power cycled, to the OS the SSD appears to be operating with the firmware before the update, at least with respect to the firmware revision identifier. If the OS is one of certain versions of Windows (e.g. 95, 98, ME, NT, XP, 2000. Server, Vista, and 7), then delaying visibility of the updated firmware revision identifier, in some embodiments and/or usage scenarios, prevents the OS from encountering an unrecoverable error that renders the OS unable to continue to run (e.g. user applications) without a reboot and/or power cycle. The firmware revision identifier is visible to the OS, e.g., in response to a SATA 'IDENTIFY' command that returns VPD data of the device, or alternatively in response to as SCSI/SAS read VPD command. For instance, in a SATA context, a firmware revision identifier is included in Identify Device Data Words 23-26. For another instance, in a SCSI context a firmware revision identifier is included in a Device Constituents VPD page, such as in a product revision level entry.

The delaying of visibility of at least a portion of the firmware update effects corresponds, e.g., to delaying visibility of one or more changes in identify and/or identification information. Firmware of a device (e.g. a storage device) is updated and activated (e.g. via a controller of the storage device booting the updated firmware), and all or any portions of identify/identification data structure(s) referenced to return identify and/or identification information to a computing host. (e.g. a computer running an OS such as Windows) are preserved in states corresponding to the firmware before the firmware update. The controller retains the values in the preserved identify/identification data structure(s) in the preserved states until an event that ends delaying of visibility is detected by the controller (or a notification thereof provided to the controller). After the event, the controller boots the updated firmware but no longer preserves the identify/identification data structure(s), and instead builds anew the identify/identification data structure(s) according to the updated firmware.

The identify and/or identification information includes any combination of all or any portions of identifying information, operating parameters, and other information that varies between versions of firmware, products, product lines, and specific instances thereof. Examples of the identifying information are a firmware revision identifier, a firmware revision number, and identification of a particular SSD or product employing same. Additional examples of the identifying information are a reference that is unique to a particular instance (e.g. a serial number), a reference that is unique to a particular class of instances (e.g. a revision identifier/level or a product ID), and a reference that is unique to a particular manufacturer/corporation (e.g. a vendor ID). Examples of the operating parameters include one or more parameters subject to SSP, such as SSP parameters not otherwise preserved across COMINIT/COMRESET commands, a firmware update, a link reset, a PHY power management mode transition, and/or a power cycle.

The identify/identification data structure(s) is preserved via one or any combination of several techniques, For a first example technique, the controller protects the identify/identification data structure(s) from modification, e.g. via preventing modification of storage location(s) allocated to the data structure(s) during boot until there is an event that ends delaying of visibility, or alternatively enabling modification of the storage location(s) only for a boot that is associated with an event that ends delaying of visibility. Optionally, information that would otherwise have been stored in the identify/identification data structure(s) is stored in other data structure(s), e.g. corresponding to a vendor specific structure (such as one or more vendor specific fields in a VPD area).

For a second example technique, the controller, operating in conjunction with a driver on a host, provides information from the identify/identification data structure(s) to the driver before new firmware is downloaded, activated, and/or booted. As part of downloading, activating, and/or booting (without an event that ends delaying of visibility) the new firmware, the drive supplies the previously provided identify/identification data structure(s) information to the controller, and the controller populates storage location(s) allocated to the identify/identification data structure(s) with the supplied information.

For a third example technique, a driver on a host provides information to a device for the device to populate identify/identification data structure(s) with. The driver supplies the information after a firmware update and before the device responds to any command from the host that depends on the populated identify/identification data structure(s). For instance, the information corresponds to one or more parameters subject to SSP.

Optionally, in combination with any of aforementioned techniques, a device is enabled to provide a host with information that is otherwise only to become visible in identify/identification data structure(s)) after an event that ends delaying of visibility. As a specific example, firmware of a storage device is updated under direction of a host, with preservation of a firmware revision identifier. Thus, with respect to an Identify Frame as perceived by an OS (e.g. a version of Windows) executing on the host, the firmware revision identifier remains unchanged across the firmware update, preventing the OS from an unrecoverable error (e.g. a "crash") due to a new firmware revision identifier becoming visible without a reboot and/or a power cycle. After the firmware update, an agent executing on the host (e.g. an application program or a driver) performs a check to determine if the firmware on the storage device is a most recent version. The agent sends a particular command (e.g. a read of vendor specific identify/identification information, the read being different than a read that would return an Identify Frame) to the storage device, and in response the storage device provides the new firmware revision identifier. The agent then compares the new firmware revision identifier with a most recent firmware revision identifier to determine if the storage device has the most recent firmware.

In response to the particular command the agent sends to determine which firmware version the device is running, the new firmware revision identifier is provided, e.g., from a "shadow" VPD area that is updated with a firmware revision identifier corresponding to a version of firmware as the firmware boots, irrespective of whether the firmware is "new" or "old", and irrespective of whether the boot is associated with an event that ends delaying of visibility or not. Alternatively the new firmware revision identifier is provided from a "log" written with a firmware revision identifier corresponding to a booting version of firmware as the firmware boots.

Optionally, previous firmware version identifiers are stored in the shadow VPD area. Further optionally, mode information (e.g. accessible by the host via a command to the device) in the device selectively determines whether or not the shadow VPD area is updated on an event that ends delaying of visibility. For example, the mode information is set to prevent updates to the shadow VPD area on a power cycle, enabling a firmware revision identifier to remain unchanged in a system where such a change would otherwise result in an error. The shadow VPD area is optionally accessible via a SMART Log and/or a vendor specific mechanism such as a vendor specific command.

Although the foregoing specific example is with respect to a firmware revision identifier, other embodiments treat parameters subject to SSP in a similar manner, as well as preserved identify/identification information, and more generally any portions of a firmware update that is subject to delayed visibility to an OS.

Optionally, either alone or in combination with any of the aforementioned techniques, a device is enabled to store and subsequently provide a host with results of a most-recent firmware update and/or one or more previous firmware updates. The storing and providing enables, e.g., "rolling back" to one or more previous versions of firmware, to access identify/identification information from execution of one or more previous versions of firmware, to access identify/identification information from execution of a current version of firmware (such as a firmware identifier and/or one or more parameters subject to SSP that are otherwise subject to delaying of visibility).

An example of a firmware update is when an or any portions of firmware used by a device (such as by executing the firmware by a processor of the device) is replaced with new firmware, and the device then functions using the new firmware (such as by booting and then executing the new firmware and/or by one or more libraries and/or tables being made accessible to executing firmware). The replacing optionally includes, for instance, (over)writing non-volatile (e.g. flash memory) allocated to retaining firmware (e.g. used to store firmware).

In some embodiments, accessing compressed data of varying-sized quanta in NVM provides improved storage efficiency in some usage scenarios. For example, an SSD controller receives (uncompressed) data from a computing host (e.g., relating to a disk write command), compresses the data, and stores the compressed data into flash memory. In response to a subsequent request from the computing host (e.g., relating to a disk read command), the SSD controller reads the compressed data from the flash memory, uncompresses the compressed data, and provides the uncompressed data to the computing host. The compressed data is stored in the flash memory according to varying-sized quanta, the quanta size varying due to, e.g., compression algorithm, operating mode, and compression effectiveness on various data. The SSD controller uncompresses the data in part by consulting an included map table to determine where header(s) are stored in the flash memory. The SSD controller parses the header(s) obtained from the flash memory to determine where appropriate (compressed) data is stored in the flash memory. The SSD controller uncompresses the appropriate data from the flash memory to produce uncompressed data to provide to the computing host. In the instant application, uncompress (and variants thereof) is synonymous with decompress (and variants thereof).

In various embodiments, an SSD controller includes a host interface for interfacing with a computing host, an interface for interfacing with NVM such as flash memory, and circuitry for controlling the interfaces and performing (and/or controlling various aspects of the performing) compressing and uncompressing, as well as lower-level error correction, higher-level error correction, and dynamic higher-level redundancy mode management with independent silicon elements.

According to various embodiments, some host interfaces are compatible with one or more of a USB interface standard, a CF interface standard, an MMC interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a PC, a laptop computer, a notebook computer, a netbook computer, a PDA, a media player, a media recorder, a digital camera, a cellular handset, a cordless telephone handset, and an electronic game. In some embodiments, an interfacing host (such as a SAS/SATA bridge) operates as a computing host and/or as a bridge to a computing host.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis codes, and zero or more LDPC codes.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1) A method comprising:
(a) operating a device in accordance with current firmware associated with current select identification information, the operating of (a) comprising returning the current select identification information to a computing host communicating with the device;
(b) after (a), in the device, receiving net firmware associated with new select identification information, the new select identification information having one or more elements corresponding to respective elements of the current select identification information, at least one of the elements of the new select identification information having a value that is different than the corresponding element of the current select identification information;
(c) after (b), operating the device in accordance with the new firmware, the operating of (c) comprising returning the current select identification information to the computing host; and
(d) after (b) and in response to an event that ends delaying of visibility of the new select identification information, operating the device in accordance with the new firmware, the operating of (d) comprising returning the new select identification information to the computing host.

EC2) The method of EC1, wherein the three acts of returning are each in response to a respective instance of a Serial Advanced Technology Attachment (SATA) IDENTIFY command type.

EC3) The method of EC1, wherein the three acts of returning are each in response to a respective instance of a Small Computer System Interface (SCSI) read Vital Product Data (VPD) command type.

EC4) The method of EC1, wherein the three acts of returning are each in response to a respective instance of a particular one of one or more command types from the computing host, the particular command type being such that if the returning in (c) returned the new select identification information, then an operating system (OS) executing on the computing host would encounter an unrecoverable error.

EC5) The method of EC4, wherein the OS comprises a version of a Windows OS.

EC6) The method of EC4, wherein the particular command type comprises a Serial Advanced Technology Attachment (SATA) IDENTIFY command type.

EC7) The method of EC4, wherein the particular command type comprises a Small Computer System Interface (SCSI) read Vital Product Data (VPD) command type.

EC8) The method of EC4, wherein the particular command type comprises a Serial Attached Small Computer System Interface (Serial SCSI) (SAS) read Vital Product Data (VPD) command type.

EC9) The method of EC1, wherein:
the new firmware is first new firmware and the new select identification information is first new select identification information; and further comprising
(e) after (c) receiving second new firmware associated with second new select identification information; and
(f) after (e), operating the device in accordance with the second new firmware, the operating of (f) comprising returning the current select identification information to the computing host.

EC10) The method of EC9, wherein the four acts of returning are each in response to a respective instance of a particular one of one or more command types from the computing host, the particular command type being such that if the returning in (f) returned the new select identification information, then an operating system (OS) executing on the computing host would encounter an unrecoverable error.

EC11) The method of EC10, wherein the particular command type comprises a Serial Advanced Technology Attachment (SATA) IDENTIFY command type.

EC12) The method of EC10, wherein the particular command type comprises a Small Computer System Interface (SCSI) read Vital Product Dater (VPD) command type.

EC13) method of EC10, wherein the particular command type comprises a Serial Attached Small Computer System Interface (Serial SCSI) (SAS) read Vital Product Data (VPD) command type.

EC14) The method of EC1, wherein current identification information is the current select identification information in combination with current other identification information, and the returning of (a) returns the current select identification information in combination with the current other identification information.

EC15) The method of EC1, wherein the new identification information is the new select identification information in combination with new other identification information, and the returning of (c) returns the current select identification information via returning the new select identification information in combination with the current other identification information.

EC16) The method of EC1,
wherein current identification information is the current select identification information in combination with current other identification information, and the returning of (a) returns the current select identification information in combination with the current other identification information; and
wherein the new identification information is the new select identification information in combination with new other identification information, the new identification information having one or more elements corresponding to respective elements of the current identification information, the new other identification information having one or more elements corresponding to respective elements of the current other identification information, and the returning of (c) returns the current select identification information via returning the new select identification information in combination with the current other identification information.

EC17) The method of EC1, further comprising:
executing and/or downloading at least a portion of the current firmware to form the association between the current firmware and the current select identification information; and
executing and/or downloading at least a portion of the new firmware to form the association between the new firmware and the new select identification information.

EC18) The method of EC1, wherein the event that ends delaying of visibility of the new select identification information comprises any one or more of:
the device being power cycled,
all or any portions of the device transitioning from one power mode to another;
the device receiving a vendor specific command,
the device receiving a particular parameter and/or code as part of a firmware update, and
a link coupling the device to a host being reset.

EC19) The method of EC1, wherein:
the current select identification information is a current firmware revision identifier;
the new select identification information is a new firmware revision identifier; and
the three acts of returning are each in response to an instance of a Serial Advanced Technology Attachment (SATA) IDENTIFY command.

EC20) The method of EC1, wherein:
the current select identification information is a current firmware revision identifier;
the new select identification information is a new firmware revision identifier; and
the three acts of returning are each in response to an instance of a read Vital Product Data (VPD) command.

EC21) The method of EC20, wherein the read comprises a Small Computer System Interface (SCSI) read.

EC22) The method of EC20, wherein the read comprises a Serial Attached Small Computer System Interface (Serial SCSI) (SAS) read.

EC23) The method of EC1, wherein:
the current select identification information is a protocol compatibility level; and
the new select identification information is a protocol compatibility level.

EC24) The method of EC1, further comprising operating the computing host to receive the current select identification information from the device and/or to provide the received current select identification information to the device.

EC25) The method of EC1, further comprising storing at least a portion of the current select identification information in one or more non-volatile memories.

EC26) The method of EC25, wherein an SSD controller comprises a storage interface compatible with a storage interface standard, and the communicating between the computing host and the device is via the storage interface.

EC27) The method of EC1, wherein the select identification information comprises a firmware revision identifier.

EC28) The method of EC1, wherein the select identification information comprises one or more parameters subject to Software Settings Preservation (SSP).

EC29) The method of EC1, wherein the receiving comprises saving the current select identification information until the event that ends delaying of visibility of the new select identification information.

EC30) The method of EC1, wherein the receiving comprises protecting the current select identification information from modification until the event that ends delaying of visibility of the new select identification information.

EC31) The method of EC1, further comprising, in response to the event that ends delaying of visibility of the new select identification information, unprotecting the current select identification information from modification.

EC32) The method of EC1, wherein the receiving comprises providing the current select identification information to the computing host and restoring the current select identification information from the computing host.

EC33) The method of EC1, wherein the receiving comprises activating the new firmware.

EC34) The method of EC1, wherein the device comprises a storage device.

EC35) The method of EC1, wherein the device comprises a controller, and the three acts of operating and the act of receiving are performed at least in part by the controller.

EC36) The method of EC1, wherein the communicating between the computing host and the device is via a storage interface compatible with a storage interface standard.

EC37) The method of EC1, wherein the device comprises a Solid-State Disk (SSD).

EC38) The method of EC37, wherein the SSD comprises an SSD controller, and the three acts of operating and the act of receiving are performed at least in part by the SSD controller.

EC39) The method of EC38, wherein the SSD controller comprises a non-volatile memory interface, and the storage of the stored portion is at least in part via the non-volatile memory interface.

EC40) The method of EC38, wherein the SSD further comprises one or more non-volatile memories.

EC41) The method of EC40, wherein the SSD controller comprises a non-volatile memory interface to interface with the non-volatile memories.

EC42) A method comprising:
receiving, in a device, first firmware from a computing host;
receiving, in the device, second firmware from the computing host, the receiving of the second firmware being after the receiving of the first firmware;
while executing the second firmware, in response to a particular command type from the computing host, providing the computing host with access to any combination of the first firmware and the second firmware.

EC43) The method of EC42, wherein the access comprises returning identification information to an Operating System (OS) executing on the computing host, the identification information comprises some information determined by execution of the first firmware and some information determined by execution of the second firmware, the information determined by execution of the first firmware being such that if corresponding information determined by execution of the second firmware were returned instead, then the OS would encounter an unrecoverable error.

EC44) The method of EC43, wherein the OS comprises a version of a Windows OS.

EC45) The method of EC44, wherein the particular command type comprises a Serial Advanced Technology Attachment (SATA) IDENTIFY command type or a Small Computer System Interface (SCSI) read Vital Product Data (VPD) command type.

EC46) The method of EC42, wherein the access comprises returning identification information to an Operating System (OS) executing on the computing host, the identification information comprises some information determined by execution of the first firmware and some information determined by execution of the second firmware, and the particular command type comprises a Serial Advanced Technology Attachment (SATA) IDENTIFY command type or a Small Computer System Interface (SCSI) read Vital Product Data (VPD) command type.

EC47) The method of EC46, wherein the information determined by execution of the first firmware is such that if corresponding information determined by execution of the second firmware were returned instead, then the OS would encounter an unrecoverable error.

EC48) The method of EC47, wherein the OS comprises a version of a Windows OS.

EC49) The method of EC42, wherein the providing access comprises causing the device to boot in accordance with the accessed firmware.

EC50) The method of EC42, wherein the providing access comprises reading and/or writing all or any portions of a firmware image of the accessed firmware.

EC51) The method of EC42, wherein the providing access comprises reading and/or writing all or any portions of one or more results of execution of all or any portions of the accessed firmware.

EC52) The method of EC51, wherein the results include an image of all or any portion of Vital Product Data (VPD).

EC53) The method of EC51, wherein the results include a firmware revision identifier.

EC54) The method of EC51, wherein the results include one or more parameters subject to Software Settings Preservation (SSP).

EC55) The method of EC42, wherein the providing access comprises managing one or more data structures in one or more non-volatile memories.

EC56) A method comprising:
receiving, in a device, first firmware from a computing host, the first firmware being associated with first firmware identification information.
receiving, in the device, second firmware from the computing host, the receiving of the second firmware being after the receiving of the first firmware, the second firmware being associated with second firmware identification information; and
returning, by the device and to the computing host, the first firmware identification information, the returning being in response to a particular command type from the computing host and being while the device is executing the second firmware and before a particular event occurs.

EC57) The method of EC56, wherein the returning of the first firmware identification information enables an Operating System (OS) executing on the computing host to continue executing without rebooting throughout the device executing the first firmware and during executing the second firmware until the particular event.

EC58) The method of EC57, wherein the OS comprises a version of a Windows OS.

EC59) The method of EC57, wherein the particular command type comprises a Serial Advanced Technology Attachment (SATA) IDENTIFY command type.

EC60) The method of EC57, wherein the particular command type comprises a Serial Attached Small Computer System Interface (Serial SCSI) (SAS) read Vital Product Data (VPD) command type.

EC61) The method of EC56, wherein the returning of the first firmware identification information enables an Operating System (OS) executing on the computing host to continue executing without detecting an error in response to a change in a value of a returned firmware revision identifier throughout the device executing the first firmware and during executing the second firmware until the particular event.

EC62) The method of EC61, wherein the OS comprises a version of a Windows OS.

EC63) The method of EC61, wherein the particular command type comprises a Serial Advanced Technology Attachment (SATA) IDENTIFY command type.

EC64) The method of EC61, wherein the particular command type comprises a Serial Attached Small Computer System Interface (Serial SCSI) (SAS) read Vital Product Data (VPD) command type.

EC65) The method of EC56, wherein the device comprises a Solid State Disk (SSD), and the SSD comprises a controller enabled to manage one or more non-volatile memories of the SSD to store all or any portions of all or any combination of the first firmware, the first firmware identification information, the second firmware, and the second firmware identification information.

EC66) The method of EC56, wherein the particular event comprises any one or more of:
the device being power cycled,
all or any portions of the device transitioning from one power mode to another;
the device receiving a vendor specific command,
the device receiving a particular parameter and/or code as part of a firmware update, and
a link coupling the device to a host being reset.

EC67) The method of EC56, wherein:
the first firmware identification information comprises a first firmware revision identifier, and
the second firmware identification information comprises a second firmware revision identifier.

EC68) The method of EC56, wherein:
the first firmware identification information comprises a first protocol compatibility level identifier, and
the second firmware identification information comprises a second protocol compatibility level identifier.

EC69) The method of EC56, wherein:
the first firmware identification information comprises a first set of values corresponding to one or more parameters subject to Software Settings Preservation (SSP), and
the second firmware identification information comprises a second set of values corresponding to the parameters.

EC70) A method comprising:
receiving, in a device, first firmware from a computing host, the first firmware being associated with first firmware identification information;

receiving, in the device, second firmware from the computing host, the receiving of the second firmware being after the receiving of the first firmware, the second firmware being associated with second firmware identification information; and returning, by the device and to the computing host, the first firmware identification information, the returning being in response to a first command type from the computing host and being while the device is executing the second firmware; and returning, by the device and to the computing host, the second firmware identification information, the returning being in response to a second command type from the computing host and being while the device is executing the second firmware.

EC71) The method of EC70, wherein:
the first command type is a read-identity command type; and
the second command type is a vendor specific command type.

EC72) The method of EC71, wherein the vendor specific command type comprises a vendor specific firmware identification information read command type.

EC73) The method of EC71, wherein the read-identity command type comprises a Serial Advanced Technology Attachment (SATA) IDENTIFY command type.

EC74) The method of EC71, wherein the read-identity command type comprises a Serial Attached Small Computer System Interface (Serial SCSI) (SAS) read Vital Product Data (VPD) command type.

EC75) The method of EC71, wherein the read-identity command type comprises a command type that when processed such that the second firmware identification information is returned instead of the first firmware identification information, an Operating System (OS) executing on the computing host encounters an unrecoverable error.

EC76) The method of EC75, wherein the OS comprises a version of a Windows OS.

EC77) The method of EC70, wherein the returning of the first firmware identification information enables an Operating System (OS) executing on the computing host to continue executing without rebooting throughout the device executing the first firmware and executing the second firmware.

EC78) The method of EC77, wherein the OS comprises a version of a Windows OS.

EC79) The method of EC77, wherein the particular command type comprises a Serial Advanced Technology Attachment (SATA) IDENTIFY command type.

EC80) The method of EC77, wherein the particular command type comprises a Serial Attached Small Computer System Interface (Serial SCSI) (SAS) read Vital Product Data (VPD) command type.

EC81) The method of EC70, wherein the returning of the first firmware identification information enables an Operating System (OS) executing on the computing host to continue executing without detecting an error in response to a change in a value of a returned firmware revision identifier throughout the device executing the first firmware and executing the second firmware.

EC82) The method of EC81, wherein the OS comprises a version or a Windows OS.

EC83) The method of EC81, wherein the particular command type comprises a Serial Advanced Technology Attachment (SATA) IDENTIFY command type.

EC84) The method of EC81, wherein the particular command type comprises a Serial Attached Small Computer System Interface (Serial SCSI) (SAS) read Vital Product Data (VPD) command type.

EC85) The method of EC70, wherein the device comprises a Solid State Disk (SSD), and the SSD comprises a controller enabled to manage one or more non-volatile memories of the SSD to store all or any portions of all or any combination of the first firmware, the first firmware identification information, the second firmware, and the second firmware identification information.

EC86) The method of EC70, wherein:
the first firmware identification information comprises a first firmware revision identifier, and
the second firmware identification information comprises a second firmware revision identifier.

EC87) The method of EC70, wherein:
the first firmware identification information comprises a first protocol compatibility level identifier, and
the second firmware identification information comprises a second protocol compatibility level identifier.

EC88) The method of EC70, wherein:
the first firmware identification information comprises a first set of values corresponding to one or more parameters subject to Software Settings Preservation (SSP), and
the second firmware identification information comprises a second set of values corresponding to the parameters.

EC89) A method comprising:
(a) operating a storage device controller in accordance with current firmware associated with a current firmware revision identifier, the operating of (a) comprising returning the current firmware revision identifier to a computing host communicating with a storage device comprising the storage device controller;
(b) after (a), receiving, at least in part via the storage device controller, new firmware associated with a new firmware revision identifier that is different than the current firmware revision identifier;
(c) after (b), operating the storage device controller in accordance with the new firmware, the operating of (c) comprising returning the current firmware revision identifier to the computing host;
(d) after (b) and in response to a power cycle, operating the storage device controller in accordance with the new firmware, the operating of (d) comprising returning the new firmware revision identifier to the computing host;
(f) wherein the storage device comprises Non-Volatile Memory (NVM) enabled to store at least a portion of the new firmware; and
(g) wherein the three acts of returning are each in response to a respective instance of a particular one of a plurality of command types from the computing host, the particular command type being such that if the returning of (c) returned the new firmware revision identifier, then an Operating System (OS) executing on the computing host would encounter an unrecoverable error.

EC90) The method of EC89, wherein the NVM comprises flash memory.

EC91) The method of EC89, wherein the storage device comprises a Solid-State Disk (SSD) comprising the NVM.

EC92) The method of EC91, wherein the NVM comprises flash memory.

EC93) The method of EC89, wherein the storage device comprises a Hard Disk Drive (HDD) comprising the NVM.

EC94) The method of EC89, wherein the OS comprises a version of a Windows OS.

EC95) The method of EC89, wherein the particular command type comprises a Serial Advanced Technology (SATA) IDENTIFY command type.

EC96) The method of EC89, wherein the particular command type comprises a Small computer System Interface (SCSI) read Vital Product Data (VPD) command type.

EC97) The method of EC89, wherein the particular command type comprises a Serial Attached Small Computer System Interface (Serial SCSI) (SAS) read Vital Product Data (VPD) command type.

EC98) The method of EC89, wherein the receiving comprises saving the current firmware revision identifier until the power cycle.

EC99) The method of EC89, wherein the receiving comprises protecting the current firmware revision identifier from modification until the power cycle.

EC100) The method of EC89, wherein the receiving comprises providing the current firmware revision identifier to the computing host and restoring the current firmware revision identifier from the computing host.

EC101) A method comprising:
in a storage device enabled to couple to a computing host,
Managing Non-Volatile Memory (NVM) of the storage device to store first firmware, a first firmware revision identifier, second firmware. and a second firmware revision identifier;
receiving, in the storage device, the first firmware from the computing host, the first firmware being associated with the first firmware revision identifier;
receiving, in the storage device, the second firmware from the computing host, the receiving of the second firmware being after the receiving of the first firmware, the second firmware being associated with the second firmware revision identifier;
returning, by the storage device and to the computing host, the first firmware revision identifier, the returning being in response to a particular command type from the computing host and being while the storage device is executing the second firmware and before; a particular event occurs; and
wherein the returning of the first firmware revision identifier enables an Operating System (OS) executing on the computing host to continue executing without detecting, an error in response to a change in a value of a returned firmware revision identifier throughout the storage device executing the first firmware and during executing the second firmware until the particular event.

EC102) The method of EC101, wherein the NVM comprises flash memory.

EC103) The method of EC101, wherein the storage device comprises a Solid-State Disk (SSD) comprising the NVM.

EC104) The method of EC103, wherein the NVM comprises flash memory.

EC105) The method of EC101, wherein the storage device comprises a Hard Disk Drive (HDD) comprising the NVM.

EC106) The method of EC101, wherein the particular event is a power cycle of the storage device.

EC107) The method of EC101, wherein further comprising while executing the second firmware and after the particular event occurs, in response to the particular command type from the computing host, returning to the computing host the second firmware revision identifier.

EC108) The method of EC101, wherein the OS comprises a version of a Windows OS.

EC109) The method of EC101, wherein the particular command type comprises a Serial Advanced Technology Attachment (SATA) IDENTIFY command type.

EC110) The method of EC101, wherein the particular command type comprises a Serial Attached Small Computer System Interface (Serial SCSI) (SAS) read Vital Product Data (VPD) command type.

EC111) A method comprising:
  managing Non-Volatile Memory (NVM) of a storage device to store first firmware, a first firmware revision identifier, second firmware, and a second firmware revision identifier, the storage device enabled to couple to a computing host;
  receiving, in the storage device, the first firmware from the computing host, the first firmware being associated with the first firmware revision identifier;
  receiving, in the storage device, the second firmware from the computing host, the receiving of the second firmware being after the receiving of the first firmware, the second firmware being associated with the second firmware revision identifier;
  returning, by the storage device and to the computing host, the first firmware revision identifier, the returning of the first firmware revision identifier being in response to a first command type from the computing host and being while the storage device is executing the second firmware;
  returning, by the storage device and to the computing host, the second firmware revision identifier, the returning of the first firmware revision identifier being in response to a second command type from the computing host and being while the storage device is executing the second firmware;
  wherein the first command type is a read-identity command type; and
  wherein the second command type is a vendor specific command type.

EC112) The method of EC111, wherein the NVM comprises flash memory.

EC113) The method of EC111, wherein the storage device comprises a Solid-State Disk (SSD) comprising the NVM.

EC114) The method of EC113, wherein the NVM comprises flash memory.

EC115) The method of EC111, wherein the storage device comprises a Hard Disk Drive (HDD) comprising the NVM.

EC116) The method of EC111, wherein the vendor specific command type comprises a vendor specific firmware identification information read command type.

EC117) The method of EC111, wherein the read-identity command type comprises a Serial Advanced Technology Attachment (SATA) IDENTIFY command type.

EC118) The method of EC111, wherein the read-identity command type comprises a Serial Attached Small Computer System Interface (Serial SCSI) (SAS) read Vital Product Data (VPD) command type.

EC119) The method of EC111, wherein the read-identity command type comprises a command type that when processed such that the second firmware revision identifier is returned instead of the first firmware revision identifier, an Operating System (OS) executing on the computing host encounters an unrecoverable error.

EC120) The method of EC119, wherein the OS comprises a version of a Windows OS.

EC121) A system comprising:
  (a) means for executing in accordance with a selected one of a plurality of firmware images, each of the firmware images having a corresponding identifier, wherein the firmware images comprise respective current and new firmware images having respective corresponding current and new identifiers;
  (b) means for using the means for executing with the selected firmware image being the current firmware image and while doing so, in response to a first instance of a particular one of a plurality of command types from a computing host, returning the current identifier;
  (c) means, operable after the means of (b), for receiving the new firmware image having the new identifier;
  (d) means, operable after the means of (c), for using the means for executing with the selected firmware image being the new firmware image and while doing so, in response to a second instance of the particular command type, returning the current identifier;
  (e) means, operable after the means of (b) and in response to a power cycle, for using the means for executing with the selected firmware image being the new firmware image and while doing so, in response to a third instance of the particular command type, returning the new identifier:
  flash memory enabled to store at least a portion of the new firmware; and
  wherein the particular command type is such that when
    (i) a first respective identifier is returned to the computing host in response to a first respective instance of the particular command type,
    (ii) a second respective identifier is returned to the computing host in response to a second respective instance of the particular command type, and
    (iii) without the power cycle occurring between the first respective identifier being returned and the second respective identifier being returned, then
      an Operating System (OS) executing on the computing host encounters an unrecoverable error in response to the return of the second respective identifier.

EC122) The system of EC121, wherein the system comprises all or any portions of a Solid-State Disk (SSD).

EC123) The system of EC121, wherein the OS comprises a version of a Windows OS and the particular command type comprises a Serial Advanced Technology Attachment (SATA) IDENTIFY command type.

EC124) The system of EC121, wherein the OS comprises a version of a Windows OS and the particular command type comprises a Serial Attached Small Computer System Interface (Serial SCSI) (SAS) read Vital Product Data (VPD) command type.

Any of the foregoing ECs having or referring to an SSD controller, wherein the SSD controller is implemented in a single Integrated Circuit (IC).

Any of the foregoing ECs having or referring to an SSD controller and one or more non-volatile memories, wherein the SSD controller and the non-volatile memories are comprised in an SSD.

Any of the foregoing ECs having or referring to one or more non-volatile memories, wherein at least one of the non-volatile memories comprises one or more flash memories.

Any of the foregoing ECs having or referring to an SSD controller and a computing host, wherein the SSD controller composes a storage interface that is compatible with a storage interface standard and enabled to couple to the computing host.

Any of the foregoing ECs having or referring to an SSD controller, wherein the SSD controller comprises a non-volatile memory interface.

Any of the foregoing ECs having or referring to a non-volatile memory interface, wherein the non-volatile memory interface comprises a flash memory interface.

Any of the foregoing ECs having or referring to an SSD controller, wherein the SSD controller comprises a flash memory interface.

Any of the foregoing ECs having or referring to one or more flash memories, wherein at least one of the flash memories comprises one or more of
- NAND flash technology storage cells, and
- NOR flash technology storage cells.

Any or the foregoing ECs having or referring to one or more flash memories, wherein at least one of the flash memories comprises one or more of
- Single-Level Cell (SLC) flash technology storage cells, and
- Multi Level Cell (MLC) flash technology storage cells, Any of the foregoing ECs having or referring to a flash memory interface, wherein the flash memory interface is compatible with one or more of
- an Open NAND Flash Interface (ONFI),
- a Toggle-mode interface,
- a Dual Data Rate (DDR) synchronous interface,
- a synchronous interface, and
- an asynchronous interface.

Any of the foregoing ECs having or referring to a storage interface standard, wherein the storage interface standard comprises one or more of
- a Universal Serial Bus (USB) interface standard,
- a Compact Flash (CF) interface standard,
- a MultiMediaCard (MMC) interface standard,
- a Secure Digital (SD) interface standard,
- a Memory Stick interface standard,
- an xD-picture card interface standard,
- an Integrated Drive Electronics (IDE) interface standard,
- a Serial Advanced Technology Attachment (SATA) interface standard,
- an external SATA (eSATA) interface standard,
- a Small Computer System Interface (SCSI) interface standard,
- a Serial Attached Small Computer System Interface (SAS) interface standard,
- a Fibre Channel interface standard,
- an Ethernet interface standard, and
- a Peripheral Component Interconnect express (PCIe) interface standard.

Any of the foregoing ECs having or referring to a computing host, wherein the computing host comprises one or more of
- a computer,
- a workstation computer,
- a server computer,
- a storage server,
- a Personal Computer (PC),
- a laptop computer,
- a notebook computer,
- a netbook computer,
- a Personal Digital Assistant (PDA),
- a media player,
- a media recorder,
- a digital camera,
- a cellular handset,
- a cordless telephone handset, and
- an electronic game.

Additional ECs are contemplated, including apparatus, system, method, means-plus-function, and computer readable medium analogs and/or variations of all or any portions of the foregoing ECs.

SYSTEM

FIG. 1A illustrates selected details of an embodiment of SSD 101 including SSD controller 100 providing management of device firmware update effects as seen by a host. The SSD controller is for managing non-volatile storage, such as implemented via NVM elements (e.g., flash memories). SSD controller 100 is communicatively coupled via one or more external interfaces 110 to a host (not illustrated). According to various embodiments, external interfaces 110 are one or more of: a SATA interface; a SAS interface: a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD controller 100 includes a SATA interface and a PCIe interface.

SSD controller 100 is further communicatively coupled via one or more device interfaces 190 to NVM 199 including one ore more storage devices, such as one or more of flash device 192. According to various embodiments, device interfaces 190 are one or more of: an asynchronous interface; a synchronous interface; a DDR synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each flash device 192 has, in some embodiments, one or more individual flash die 194. According to type of a particular one of flash device 192, a plurality of flash die 194 in the particular flash device 192 is optionally and/or selectively accessible in parallel. Flash device 192 is merely representative of one type of storage device enabled to communicatively couple to SSD controller 100. In various embodiments, any type of storage device is usable, such as an SLC NAND flash memory, MLC NAND flash memory, NOR flash memory, flash memory using polysilicon or silicon nitride technology-based charge storage cells, two- or three-dimensional technology-based flash memory, read-only memory, static random access memory, dynamic random access memory, ferromagnetic memory, phase-change memory, racetrack memory, ReRAM, or any other type of memory device or storage medium.

According to various embodiments, device interfaces 190 are organized as: one or more busses with one or more of flash device 192 per bus; one or more groups of busses with one or more of flash device 192 per bus, having busses in a group generally accessed in parallel; or any other organization of one or more of flash device 192 onto device interfaces 190.

Continuing in FIG. 1A, SSD controller 100 has one or more modules, such as host interfaces 111, data processing 121, buffer 131, map 141, recycler 151, ECC 161, device interface logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more host interfaces 111 to provide dual-porting. In a second example, in some embodiments, data processing 121 and/or ECC 161 are combined with buffer 131. In a third example, in some embodiments, host interfaces 111 is directly coupled to buffer 131, and data processing 121 optionally and/or selectively operates on data stored in buffer 131. In a fourth example, in some embodiments, device interface logic 191 is directly coupled to buffer 131, and ECC 161 optionally and/or selectively operates on data stored in buffer 131.

Host interfaces 111 sends and receives commands and/or data via external interfaces 110, and, in some embodiments, tracks progress of individual commands via tag tracking 113. For example, the commands include a read command specifying an address (such as an LBA) and an amount of data (such as a number of LBA quanta, e.g., sectors) to read; in response the SSD provides read status and/or read data. For another example, the commands include a write command specifying an address (such as an LBA) and an amount of data (such as a number of LBA quanta, e.g., sectors) to write; in response the SSD provides write status and/or requests write data and optionally subsequently provides a write status. For yet another example, the commands include a de-allocation command (e.g. a trim command) specifying one or more addresses (such as one or more LBAs) that no longer need be allocated; in response the SSD modifies the map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, host interfaces 111 is compatible with a SATA protocol and, using NCQ commands, is enabled to have up to 32 pending commands, each with a unique tag represented as a number from 0 to 31. In some embodiments, tag tracking 113 is enabled to associate an external tag for a command received via external interfaces 110 with an internal tag used to track the command during processing by SSD controller 100.

According to various embodiments, one ore more of: data processing 121 optionally and/or selectively processes some or all data sent between buffer 131 and external interfaces 110; and data processing 121 optionally and/or selectively processes data stored in buffer 131. In some embodiments, data processing 121 uses one or more engines 123 to perform one or more of: formatting; reformatting; transcoding; and any other data processing and/or manipulation task.

Buffer 131 stores data sent to/from external interfaces 110 from/to device interfaces 190. In some embodiments, buffer 131 additionally stores system data, such as some or all map tables, used by SSD controller 100 to manage one or more of flash device 192. In various embodiments, buffer 131 has one or more of: memory 137 used for temporary storage of data; DMA 133 used to control movement of data to and/or from buffer 131; and ECC-X 135 used to provide higher-level error correction and/or redundancy functions; and other data movement and/or manipulation functions. An example of a higher-level redundancy function is a RAID-like capability, with redundancy at a flash device (e.g., multiple ones of flash device 192) level and/or a flash die (e.g., flash die 194) level instead of at a disk level.

According to various embodiments, one or more of: ECC 161 optionally and/or selectively processes some or all data sent between buffer 131 and device interfaces 190; and ECC 161 optionally and/or selectively processes data stored in buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard decision code; a soft decision code; an erasure -based code; any error detecting and/or correcting code; and any combination of the preceding. In some embodiments, ECC 161 includes one or more decoders (such as LDPC decoders).

Device interface logic 191 controls instances of flash device 192 via device interfaces 190. Device interface logic 191 is enabled to send data to/from the instances of flash device 192 according to a protocol of flash device 192. Device interface logic 191 includes scheduling 193 to selectively sequence control of the instances of flash device 192 via device interfaces 190. For example, in some embodiments, scheduling 193 is enabled to queue operations to the instances of flash device 192, and to selectively send the operations to individual ones of the instances of flash device 192 (or flash die 194) as individual ones of the instances of flash device 192 (or flash die 194) are available.

Map 141 converts between data addressing used on external interfaces 110 and data addressing used on device interfaces 190, using table 143 to map external data addresses to locations in NVM 199. For example, in some embodiments, map 141 converts LBAs used on external interfaces 110 to block and/or page addresses targeting one or more flash die 194, via mapping provided by table 143. For LBAs that have never been written since drive manufacture or de-allocation, the map points to a default value to return if the LBAs are read. For example, when processing a de-allocation command, the map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, recycler 151 performs garbage collection. For example, in some embodiments, instances of flash device 192 contain blocks that must be erased before the blocks are re-writeable. Recycler 151 is enabled to determine which portions of the instances of flash device 192 are actively in use (e.g., allocated instead of de-allocated), such as by scanning a map maintained by map 141, and to make unused (e.g., de-allocated) portions of the instances of flash device 192 available for writing by erasing the unused portions. In further embodiments, recycler 151 is enabled to move data stored within instances of flash device 192 to make larger contiguous portions of the instances of flash device 192 available for writing.

CPU 171 controls various portions of SSD controller 100. CPU 171 includes CPU core 172. CPU core 172 is, according to various embodiments, one or more single-core or multi-core processors. The individual processors cores in CPU core 172 are, in some embodiments, multi-threaded. CPU core 172 includes instruction and/or data caches and/or memories. For example, the instruction memory contains instructions to enable CPU core 172 to execute programs (e.g. software sometimes called firmware) to control SSD controller 100. In some embodiments, some or all of the firmware executed by CPU core 172 is stored on instances of flash device 192 (as illustrated, e.g., as firmware 106 of NVM 199 in FIGS. 1B and 1C).

In various embodiments, CPU 171 further includes: command management 173 to track and control commands received via external interfaces 110 while the commands are in progress: buffer management 175 to control allocation and use of buffer 131; translation management 177 to control map 141; coherency management 179 control consistency of data addressing and to avoid conflicts such as between external data accesses and recycle data accesses; device management 181 to control device interface logic 191; identity management 182 to control modification and communication of identify information, and optionally other management units. None, any, or all of the management functions performed by CPU 171 are, according to various embodiments, controlled and/or managed by hardware, by software (such as firmware executing on CPU core 172 or on a host connected via external interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD controller 100 and is compatible with operation with various computing hosts, such as via adaptation of host interfaces 111 and/or external interfaces 110. The various computing hosts include one or any combination of a computer, a workstation computer, a server computer, a storage server, a PC, a laptop computer, a notebook computer, a netbook computer, a PDA, a media player, a media recorder, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, buffer 131 is implemented on a same die as other elements of SSD controller 100. For another example, buffer 131 is implemented on a different die than other elements of SSD controller 100.

Figure 1B:
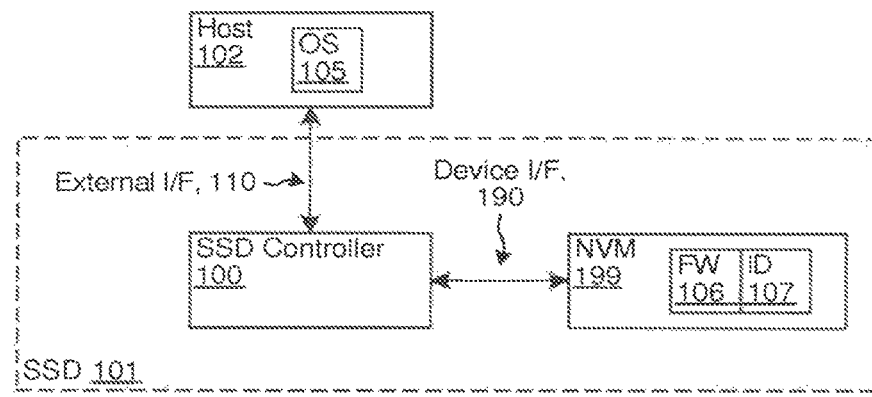
FIG. 1B illustrates selected details of an embodiment of a system including the SSD of FIG. 1A.

FIG. 1B illustrates selected details of an embodiment of a system including the SSD of FIG. 1A. SSD 101 includes SSD controller 100 coupled to NVM 199 via device interfaces 190. The SSD is coupled to host 102 via external interfaces 110. In some embodiments, SSD 101 (or variations thereof) corresponds to a SAS drive or a SATA drive that is coupled to an initiator operating as host 102.

Host 102 is enabled to execute OS 105, and the OS includes and/or is enabled to operate with drivers (not illustrated) for interfacing with the SSD. Various versions of Windows (e.g. 95, 98, ME, NT, XP, 2000, Server, Vista, and 7), various versions of Linux (e.g. Red Hat, Debian, and Ubuntu), and various versions of MacOS (e.g. 8, 9 and X) are examples of OS 105.

One or more portions of NVM 199 are used, in some embodiments, for firmware storage 106 and/or select ID information storage 107. The firmware storage includes one or more firmware images (or portions thereof). A firmware image has, for example, one or more images of software, executed, e.g., by CPU core 172 of SSD controller 100. A firmware image has, for another example, one or more images of constants, parameter values, and NVM device information, referenced, e.g. by the CPU core during the software execution. The one or more images of firmware correspond, e.g., to a current firmware image and zero or more previous (with respect to firmware updates) firmware images.

Select ID information storage 107 includes one or more images of all or any portions of identity/identification information associated with any one or more of SSD 101, SSD controller 100, all or any portions of software currently executing (or to be executed after a next power cycle) by the CPU core, and a particular product embodying the SSD. The one or more identity/identification information images correspond, e.g., to results of a current firmware image execution and zero or more previous results of firmware image executions.

In various embodiments, select ID information storage 107 includes all or any portions of a firmware revision identifier, and/or all or any portions of state and/or parameters subject to SSP. More generally, the select ID information storage includes one or more versions of all or any portions of identify and/or identification information as described elsewhere herein. The versions correspond to respective versions of firmware and/or boots of firmware.

Figure 1C:
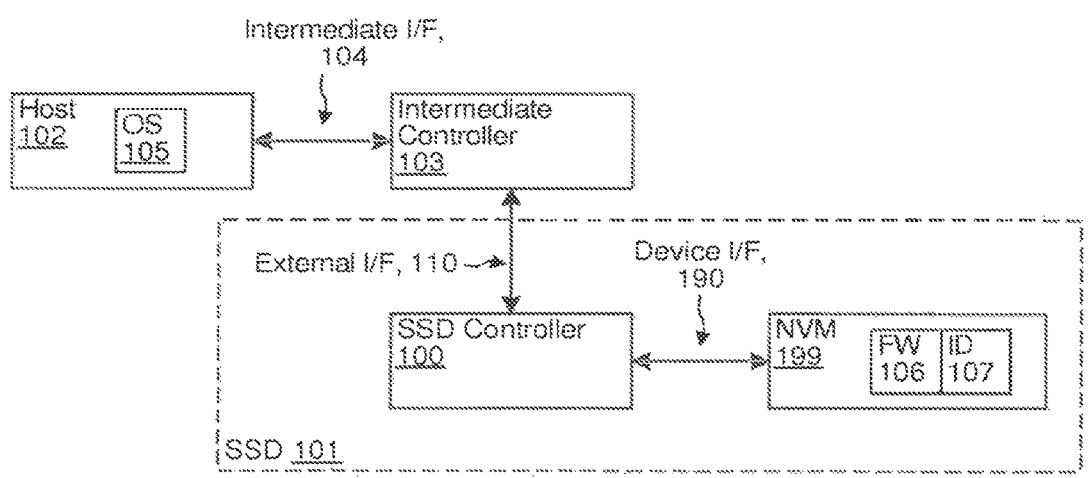
FIG. 1C illustrates selected details of another embodiment of a system including the SSD of FIG. 1A.

FIG. 1C illustrates selected details of another embodiment of a system including the SSD of FIG. 1A. As in FIG. 1B, SSD 101 includes SSD controller 100 coupled to NVM 199 via device interfaces 190. The SSD is coupled to host 102 via external interfaces 110 in turn coupled to intermediate controller 103 and then to host 102 via intermediate interfaces 104. In various embodiments, SSD controller 100 is coupled to the host via one or more intermediate levels of other controllers, such as a RAID controller. In some embodiments, SSD 101 (or variations thereof) corresponds to a SAS drive or a SATA drive and intermediate controller 103 corresponds to an expander that is in turn coupled to art initiator, or alternatively intermediate controller 103 corresponds to a bridge that is indirectly coupled to an initiator via an expander.

In various embodiments, SSD controller and/or a computing-host flash memory controller in combination with one or more NVMs are implemented as a non-volatile storage component, such as a USB storage component, a CF storage component, an MMC storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., host 102 of FIG. 1C). In various embodiments, all or any portions of an SSD controller (or a computing-host flash memory controller), or functions thereof, are implemented via hardware (e.g., logic circuitry), software and/or firmware (e.g., driver software and/or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to recycler 151 of FIG. 1A) is implemented partially via software on a host and partially via hardware in a computing-host flash memory controller.

OPERATION

Figure 2:
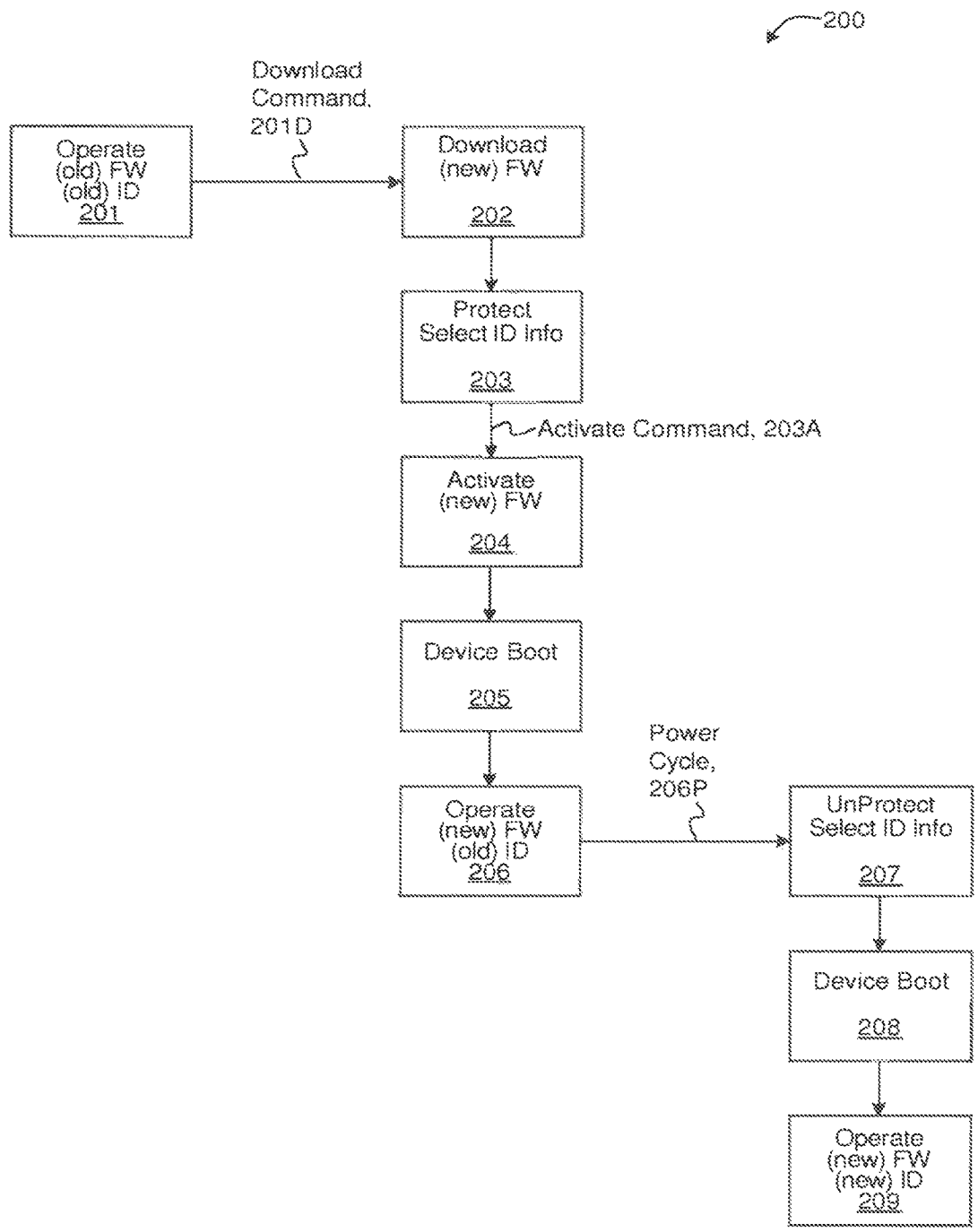
FIG. 2 illustrates a flow diagram of selected details of an embodiment of management of device firmware update effects as seen by a host.

FIG. 2 illustrates flow diagram 200 of selected details of an embodiment of management of device firmware update effects as seen by a host. An example system context for operation of the embodiment of the figure includes a device coupled to a host, with an OS running on the host. The device is responsive to commands from the host and is enabled to detect and respond to an event that ends delaying of visibility (e.g., a power cycle). The device operates in accordance with firmware (such as a controller executing the firmware). The device also operates in accordance with select identify/identification information that is readable and writable via the firmware (such as via the controller modifying a portion thereof). The select identify/identification information (also known as "ID info") is one or more subsets of the identify and/or identification information described elsewhere herein, the subsets varying according to embodiment, usage scenario, and/or operating modes of the device. The flow as illustrated in the figure provides for delaying visibility of at least a portion of effects of the firmware update, thus enabling management of device firmware update effects as seen by the host.

ID info includes one or more elements (e.g. parameters, values, and/or fields). When the device boots via the firmware and/or performs selected functions at least in part via the firmware, the ID info is referenced (e.g. read, written, or both). A particular version of firmware has a correspondence to a particular version of the ID info. For instance, during boot of a particular version of firmware, the particular version or firmware populates one or more elements of the ID info, and thus the populated ID info corresponds to the particular version of firmware. For another instance, while performing at particular function of a particular version of the firmware, one or more elements of the ID info are written, restating in a correspondence between the particular version of the firmware and the written ID info.

Specifically as illustrated in the figure, flow begins with the device operating in accordance with an "old" version of firmware and in accordance with "old" ID info that corresponds to the old firmware (Operate (old) firmware (old) ID info, 201). While flow remains in 201, when the device responds to select commands from the host that depend on ID info, the device references populated ID info that that is in accordance with the old ID info. E.g., if the device is a SATA-compatible SSD, then in response to a SATA IDENTIFY command, the device returns VPD determined from the old ID info, the VPD including, e.g., a firmware revision identifier and/or parameters subject to SSP.

An external agent (e.g. a user or a firmware version checking tool) determines that a firmware update is to be performed for the device, such as via downloading and activating/booting new firmware. The firmware update begins with the host issuing a command to the device to update/download firmware (Download Command, 201D), and in response the device obtains new firmware (Download (new) firmware, 202), optionally in conjunction with the host. Then the device alters internal state and/or functionality to prevent modification of the populated ID info until a power cycle (Protect Select ID info, 203).

The firmware update continues with the host issuing a command to the device to operate with the new firmware (Activate Command, 203A), and in response the device activates the new firmware (Activate (new) firmware, 204) and boots using the new firmware (Device Boot, 205). The populated ID info after the boot is in accordance with the old ID info (corresponding to the old firmware), since the populated ID info has been protected from modification (203). After the boot, the device operates in accordance with the new version of firmware and in accordance with the old ID info that corresponds to the old firmware (Operate (new) firmware (old) ID info, 206). While flow remains in 206, when the device responds to the select commands from the host (that depend on ID info), the device references ID info that has been populated in accordance with the old ID info, as while in 201.

Therefore, when the device responds to the select commands (that depend on ID info), the device references ID info that has been populated in accordance with the old ID info, thus delaying visibility of at least a portion of effects of the firmware update. In effect, with respect to the select commands, identical ID info is referenced before and after the firmware update.

For example, if the device is a SATA-compatible SSD, then in response to a SATA IDENTIFY command, effectively the device references the old ID info, determines a firmware revision identifier from the old ID info (the determined firmware revision identifier corresponding to the old firmware), and returns VPD that includes the old firmware revision identifier. Thus a same firmware revision identifier is provided before and after the firmware update. Providing a same firmware revision identifier before and after the firmware update enables certain versions of a Windows OS running on the host to continue to run across the firmware update without rebooting the OS, such as in situations where if the firmware revision identifiers provided before and after the update were different, then the OS would encounter an unrecoverable error and "crash".

For another example, if the device is a SATA-compatible SSD, then in response to a SATA IDENTIFY command, effectively the device references the old ID info, determines a parameter subject to SSP from the old ID info (the determined parameter subject to SSP corresponding to the old firmware), and returns VPD that includes the old parameter subject to SSP. Thus a same parameter subject to SSP is provided before and after the firmware update.

Flow is incomplete until a power cycle that enables population of ID info with information that corresponds to the new firmware. The power cycle corresponds to power cycling the device and the host, and therefore the OS on the host is rebooted as part of the power cycling (note that the OS has not been rebooted specifically with respect to any processing associated with 201-206). Thus the flow proceeds when there is a power cycle, and in response to power being removed and reapplied (Power Cycle, 206P), the device alters the internal state and/or functionality to enable modification of the populated ID info (UnProtect Select ID info, 207). The device then boots using the new firmware (Device Boot, 208). The populated ID info after the boot is new ID info (corresponding to the new firmware), since the populated ID info is enabled for modification (207). After the boot, the device operates in accordance with the new version of firmware and in accordance with the new ID info that corresponds to the new firmware (Operate (new) firmware (new) ID info, 209). While flow remains in 209, when the device responds to the select commands from the host (that depend on ID info), the device references ID info that has been populated in accordance with the new ID info. The flow is now complete, and the delaying visibility of at least a portion of effects of the firmware update is ended.

Conceptually operation in 209 is equivalent to operation in 201 (the operating is in accordance with firmware and ID info that correspond with each other). Thus yet another firmware update is optionally performed as if 209 were 201, and so forth.

In some embodiments and/or usage scenarios, a second firmware update is downloaded before an event that ends delaying of visibility has followed a first firmware update. The delaying visibility of at least a portion of effects of the firmware update is extended across the second firmware update. Conceptually the ID info is further preserved across the download of the second firmware update, until a power cycle.

More specifically, in an embodiment described with respect to FIG. 2, consider a device having received a first firmware update (firm new firmware) but not yet having been power cycled, and thus operating as in 206. A host then issues a command to the device to update/download (second new) firmware, and in response the device obtains (second new) firmware as in 202. The device then alters internal state and/or functionality to prevent modification of the populated ID info until a power cycle as in 203. The populated ID info that is protected is identical to the populated ID info before the download of the first firmware update. After activation and boot, the device operates in accordance with the second new firmware and in accordance with the old ID info (that corresponds to the old firmware before the first firmware update), similar to operation in 206. One or more additional firmware updates occur before a power cycle, in some usage scenarios, each being processed such that the populated ID info is preserved across the respective firmware update.

In some embodiments and/or usage scenarios, one or more of operations 202-205 are combined and/or performed in differing orders than depicted in the figure. For example, 202 and 203 are combined such that a command to download firmware is interpreted by the device to include preventing modification of the populated ID info until a power cycle as well as updating/downloading firmware. For another example, 203 is performed before 202, in response to a command to download firmware. In some embodiments, 204 follows 203 without receipt of a command to operate with the new firmware. Other variations are contemplated.

Figure 3:
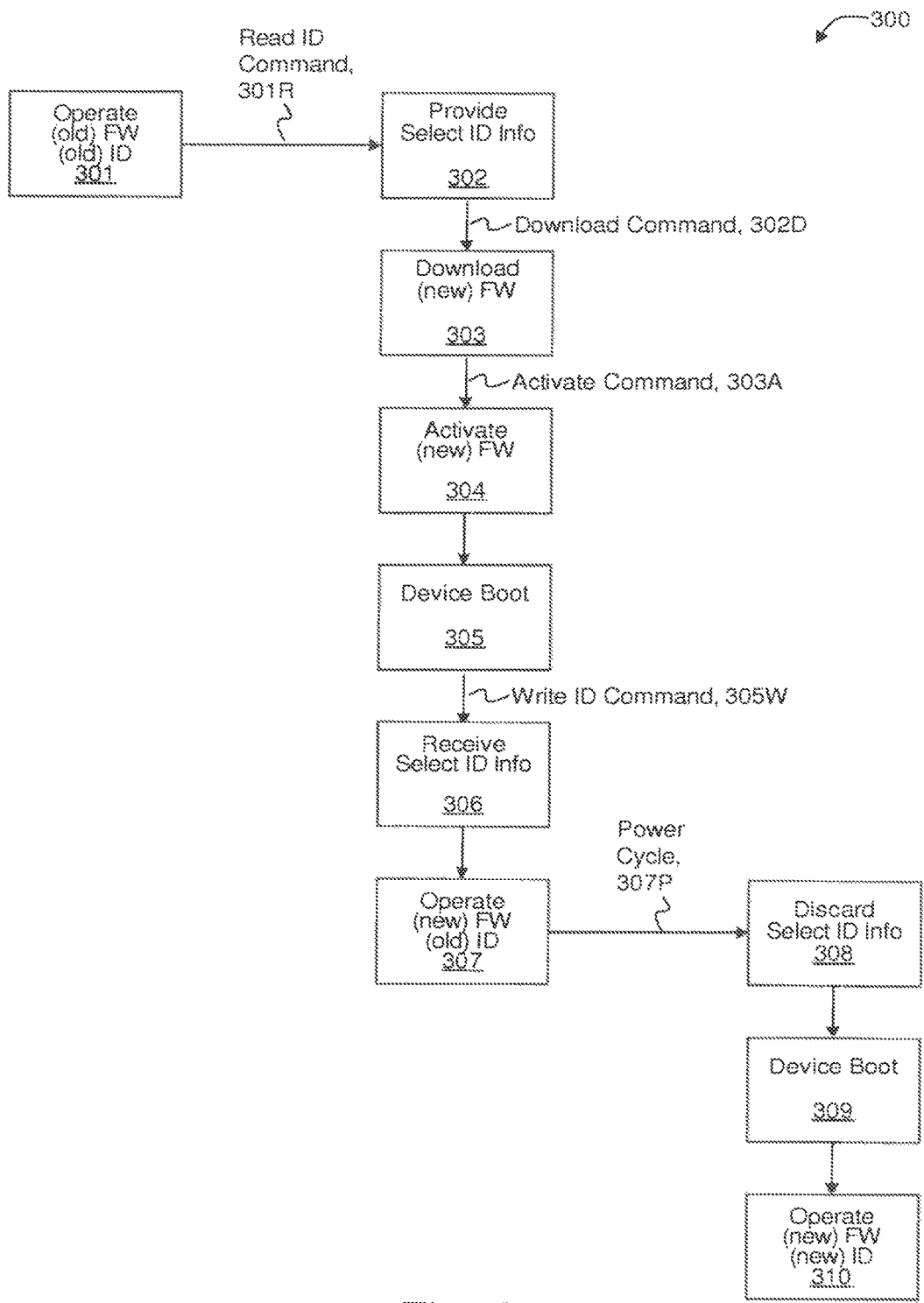
FIG. 3 illustrates a flow diagram of selected details of another embodiment of management of device firmware update effects as seen by a host.

FIG. 3 illustrates flow diagram 300 of selected details of another embodiment of management of device firmware update effects as seen by a host. The embodiment of FIG. 3 operates in some respects similarly to FIG. 2. The example system context for operation of the embodiment of FIG. 2 is applicable to the embodiment of FIG. 3. The flow as illustrated in the figure provides for delaying visibility of at least a portion of effects of the firmware update, thus enabling management of device firmware update effects as seen by the host.

As illustrated in the figure, flow begins with the device operating in accordance with an "old" version of firmware and in accordance with "old" ID info that corresponds to the old firmware (Operate (old) firmware (old) ID info, 301). While flow remains in 301, operation is similar to 201 of FIG. 2, such that when the device responds to select commands from the host (that depend on ID info), the device references ID info that has been populated in accordance with the old ID info.

Further similarly to FIG. 2, an external agent determines that a firmware update is to be performed for the device. However, unlike the FIG. 2 embodiment, in the FIG. 3 embodiment, the firmware update begins with the host issuing a command to the device to provide ID info from the device to the host (Read ID Command, 301R). In response the device sends the populated ID info to the host (Provide Select ID Info, 302). The firmware update continues with the host issuing, a command to the device to update/download firmware (Download Command, 302D) and in response the device obtains new firmware (Download (new) firmware, 303), optionally in conjunction with the host.

The firmware update continues with the host issuing a command to the device to operate with the new firmware (Activate Command, 303A). In response the device activates the new firmware (Activate (new) firmware, 304) and boots using the new firmware (Device Boot, 305). Before the device begins operating fully with the new firmware, however, the host sends the device a command to receive ID info from the host (Write ID Command, 305W). In response the device receives ID info from the host and saves the received ID info as the populated ID info (Receive Select ID Info, 306). The host provides ID info for use in 306 that is identical to what the device provided in 302, and therefore the populated ID info is in accordance with the old ID info. The device then begins operating fully in accordance with the new firmware and the old ID info (Operate (new) firmware (old) ID info, 307). While flow remains in 307, when the device responds to the select commands from the host (that depend on ID info), the device references ID info that has been populated in accordance with the old ID info, as while in 301.

Therefore, as in FIG. 2, when the device responds to the select commands (that depend on ID info), the device effectively references the old ID info, thus delaying visibility of at least a portion of effects of the firmware update and effectively referencing identical ID info before and after the firmware update. For example, a same firmware revision identifier is provided before and after a firmware update, enabling certain versions of a Windows OS (running on the host) to continue to run across the firmware update without rebooting the OS, such as in situations where it the firmware revision identifiers provided before and after the update were different then the OS would encounter an unrecoverable error and "crash". For another example, a same parameter subject to SSP is provided before and after a firmware update.

As in FIG. 2, flow is incomplete until a power cycle that enables population of ID info with information that corresponds to the new firmware. The power cycle corresponds to power cycling the device and the host, and therefore the OS on the host is rebooted as part of the power cycling (note that the OS has not been rebooted specifically with respect to any processing associated with 301-307). Thus the flow proceeds when there is a power cycle, and in response to power being removed and reapplied (Power Cycle, 307P), the device eliminates any effect of the populated ID info written by 306 (Discard Select ID Info, 308). The device then boots using the new firmware (Device Boot, 309). The populated ID info after the boot is new ID info (corresponding to the new firmware), because there is no Write ID Command from the host to provide the old ID info, and the populated ID info is written with new ID info during the boot. After booting, the device operates in accordance with the new version of firmware and in accordance with new ID info that corresponds to the new firmware. (Operate (new) firmware (new) ID info, 310). While flow remains in 310, when the device responds to the select commands from the host (that depend on ID info), the device references ID info that has been populated in accordance with the new ID info. The flow is now complete, and the delaying visibility of at least a portion of effects of the firmware update is ended.

Conceptually operation in 310 is equivalent to operation in 301 (the operating is in accordance with firmware and ID info that correspond with each other). Thus yet another firmware update is optionally performed as if 310 were 301, and so forth.

As in FIG. 2. in some embodiments and/or usage scenarios related to FIG. 3, a second firmware update is downloaded before an event that ends delaying of visibility has followed a first firmware update. The delaying visibility of at least a portion of effects of the firmware update is extended across the second firmware update. Conceptually the ID info is repopulated with old ID info after the second firmware update.

More specifically, in an embodiment described with respect to FIG. 3, consider a device having received a first firmware update (first new firmware) but not yet having been power cycled, and thus operating as in 307. A host then begins a (second new) firmware update by issuing a command to the device to provide populated ID info as in 302, and in response the device does so. The firmware update continues with download of (second new) firmware, activation, and boot. Before the device begins operating fully with the (second new) firmware, however, the host sends the device a command to receive ID info (as in 305W). The host provides ID info for use that is identical to what the device provided earlier in response to the command from the host to provided populated ID info. The device writes the provided ID info as populated ID info, and therefore the populated ID info is in accordance with the old ID info. The device then begins operating fully in accordance with the second new firmware and the old ID info (that corresponds to the old firmware before the first firmware update), similar to operation in 307. One or more additional firmware updates occur before a power cycle, in some usage scenarios, each being processed such that the populated ID info is repopulated with old ID info after the respective firmware update.

In an embodiment that is conceptually a variation on the embodiment illustrated by FIG. 3, ID info corresponds, e.g., to one or more parameters subject to SSP. Before the device is fully operating with new firmware, and without reading populated ID info from the device, a host explicitly provides ID info to the device. In response the device writes the provided ID info into the populated ID info. More specifically, in an embodiment described with respect to FIG. 3, consider a device operating as in 301. Flow proceeds directly front 301 to 303 in response to the host providing the device with a download command. Flow then proceeds along 304, 305, and 306. With respect to 306, the host provides ID info that is independent of ID info provided from the device to the host, as 302 has been omitted.

In the foregoing embodiments described with respect to FIG. 2 and FIG. 3, the event that ends delaying of visibility is the device being power cycled (e.g. 206P of FIG. 2 and 307P of FIG. 3). Other embodiments are contemplated, such as where the event is any one or more of all or any portions of the device transitioning from one power mode to another (e.g. exiting a sleep mode or a PHY power management mode), the device receiving a vendor specific command, the device receiving a particular parameter and/or code as part of a firmware update, and a reset of a link coupling the device to a host.

In some embodiments and/or usage scenarios, one or more of operations 302-306 are combined and/or performed in differing orders than depicted in the figure. For example, 302 and 303 are combined and/or performed in a different order than depicted such that a command to download firmware is interpreted by the device to include the device sending the populated ID info to the host as well as updating/downloading firmware, and the command to provide populated ID info from the device to the host is not used. For another example, 304 is combined with 305, e.g. the device performs a boot (without an explicit activation) in response to a command to operate with the new firmware. In some embodiments and/or usage scenarios, 304 follows 303 without receipt of a command to operate with the new firmware. In some embodiments and/or usage scenarios, 308 is omitted, and 309 populates ID info via, e.g., overwriting previously stored ID info. Other variations are contemplated.

In various embodiments related to FIG. 2 and/or FIG. 3, a device optionally (e.g. as a function of one or more mode bits, a vendor-specific command, a firmware event detected by an SSD controller, or any combination thereof) performs any one or more of a firmware download, activation, and/or boot in response to a power cycle. For example, as a function of receiving a first vendor-specific command, a device boots using currently executing firmware, rather than activating and booting newly downloaded firmware that is not yet currently executing. Further. as a function of receiving a second vendor-specific command, the device boots using the newly downloaded firmware.

In various embodiments related to FIG. 2 and/or FIG. 3. a device is enabled to selectively provide a host with new ID info (e.g., ID info corresponding to new firmware) after a firmware update and before a power cycle. The select commands from the host (that depend on ID info) include two groups of commands. A first group of the select commands is processed by the device in accordance with populated ID info, and thus after the firmware update and before the power cycle, the first group of commands receives ID info that is in accordance with old ID info. The first group of select commands corresponds to commands from the host that if the device were to respond with new ID info, then in some usage scenarios the OS would encounter an unrecoverable error, such as a command that receives an Identify Frame in response. A second group of the select commands is processed by the device in accordance with ID info that corresponds to currently executing firmware, irrespective of whether a power cycle has occurred after the firmware update. For example, while operating in 206 (FIG. 2) or 307 (FIG. 3), in response to a command of the second group, the device provides new ID info (corresponding to the new firmware) to the host. The new ID info is provided, e.g. from a shadow VPD area and/or a log, such as written with the new ID info when the device boots with the new firmware, irrespective of whether a power cycle has occurred between the download of the new firmware and the booting.

In various embodiments related to FIG. 2 and/or FIG. 3, the delaying of visibility of at least a portion of effects of the firmware update is enabled (disabled) via one or more modes. For example, in a "delaying" mode, operation of a first mode enabled embodiment is according to FIG. 2. In a "non-delaying" mode, operation of the first mode-enabled embodiment is according to FIG. 2, except that there is no preventing of modification of the populated ID info (e.g. 203 is skipped and flow proceeds from 202 to 204 in response to a command to operate with the new firmware). Operation in 206 is then in accordance with the new firmware and the populated ID info corresponding to the new firmware. For another example, in a "delaying" mode, operation of a second mode-enabled embodiment is according to FIG. 3. In a "non-delaying" mode, operation of the second mode-enabled embodiment is according to FIG. 3, except that there is no command from the host to receive ID info (e.g. 306 is skipped and flow proceeds from 305 to 307), leaving the populated ID info as written by the booting. Operation in 307 is then in accordance with the new firmware and the populated ID info corresponding to the new firmware.

In various embodiments related to FIG. 2 and/or FIG. 3, results of a most-recent firmware update and/or one or more previous firmware updates (e.g. firmware image(s) and/or ID info produced by booting/execution of the updated firmware) are stored. Storing the previous firmware update results enables "rolling back" out of a firmware update, for example by booting from a previous firmware image. Storing the previous firmware update results enables a device to respond to a (vendor-specific) host command to provide previous ID info (e.g. related to a previous firmware update). Storing the most-recent firmware update results enables a device to respond to a (vendor-specific) host command to provide ID info that is otherwise subject to delayed visibility.

Examples of a device and a host with respect to FIGS. 2 and 3 are SSD 101 and host 102, respectively, of FIGS. 1B and 1C. An example of storage for the firmware with respect to FIGS. 2 and 3 is firmware storage 106 of FIGS. 1B and 1C. An example of the storage for all or any portions of the ID info with respect to FIGS. 2 and 3 is all or any portions of select ID information storage 107 of FIGS. 1B and 1C. Examples of "old" firmware include factory installed firmware, OEM installed firmware, and user installed firmware (e.g. from a previous download).

In various embodiments, all or any portions of operations and/or functions described by FIGS. 2 and 3 are implemented, e.g., by one or more state machines. Example implementations of the state machines include hardware (e.g. logic gates and/or circuitry, dedicated state machine circuitry, or hardwired control circuitry), software (e.g. firmware or microcode), or combinations of hardware and software. In some embodiments, one or more of the state machines are implemented at least in part via the firmware that is subject to updating. In various embodiments, one or more of the state machines are implemented in part via SSD controller 100 of FIG. 1A, in part via firmware executed by CPU core 172, and/or in part via firmware stored in firmware storage 106 of FIGS. 1B and 1C.

In various embodiments, all or any portions of operations and/or functions described by FIGS. 2 and 3 are implemented, e.g., by or in accordance with identity management 182 of FIG. 1A. In some embodiments, power removal and application (such as with respect to 206P of FIGS. 2 and 307P of FIG. 3) is determined via a power-on-reset circuit included in circuitry of a controller of a device, e.g. circuitry included in SSD controller 100 of FIG. 1A.

In various embodiments, one or more operations performed with respect to ID info as described in FIGS. 2 and/or 3 (e.g. protecting, unprotecting, providing, receiving, reading, or writing), include accessing all or any portions of firmware storage 106. For example, in some embodiments, 203 and 207 of FIG. 2 include writing at least a portion of firmware storage 106 (such as a setting and clearing a flag indicating ID info is protected from modification). For another example, in some embodiments, 302 and 306 of FIG. 3 include, respectively, reading and writing at least a portion of firmware storage 106.

In various embodiments, an HBA couples elements of a host (e.g. one or more processors and one or more memories) to a device, e.g. a storage device such as a SATA drive. The coupling of the HBA to the processors and/or the memories is at least in part via one or more device communication interfaces, buses, and/or channels (such as a PCIe interface). Some or the processors execute OS and/or driver software that communicate with the device. In some embodiments, transport between the elements of the host and the HBA is compatible with AHCI, and T13 compatible ATA commands are passed through the HBA to a SATA or a PCIe interface of an SSD of the device. In other embodiments, transport between elements of the host and the HBA is compatible with NVM Express, and commands having at least some attributes similar to T13 compatible ATA commands are passed through the HBA to a PCIe interface of an SSD of the device. In some embodiments, the HBA is included in the host, while in other embodiments the HBA is included in the device. In some embodiments, the HBA is omitted, and the device is coupled (without an explicit HBA) to one or more device communication interfaces, buses, and/or channels (such as a PCIe interface).

For example, in the context of FIG. 1B, host 102 includes an HBA that enables communication between software running on the host (e.g. OS 105 and/or associated drivers) and SSD 101 (having a SATA compatible host interface included in host interfaces 111). The communication includes delivery of commands from the software to the SSD. Transport of the commands is via AHCI, and T13 compatible ATA commands are provided to the SATA interface of the SSD. Thus 201D and 203A of FIG. 2 and 301R, 302D, 303A, and 305W of FIG. 3 are delivered via AHCI transport.

For another example, in the context of FIG. 1C, host 102 includes a chipset that enables communication with intermediate controller 103, and intermediate interfaces 104 and external interfaces 110 are PCIe compatible (e.g. SSD 101 has a interface included in host interfaces 111). The chipset and the intermediate controller 103 enable communication, including delivery of commands, between OS and/or driver software of the host and SSD 101. Transport of the commands is via NVM Express, and commands having at least some attributes similar to T13 compatible ATA commands are provided to the PCIe interface of the SSD. Thus 201D and 203A of FIG. 2 and 301R, 302D, 303A, and 305W of FIG. 3 are delivered via NVM Express transport.

Various embodiments have been described, such as of a storage device coupled to a computing host, with the storage device enabled to manage firmware update effects as seen by the computing host. Techniques applicable to a storage device and a computing host are generally applicable to various embodiments of a device coupled to a host, with the device being enabled to manage firmware update effects as seen by the host. Various embodiments have been described with an SSD as an example storage device. Techniques applicable to an SSD-based storage device are also applicable to various embodiments of an HDD-based storage device, as well as storage devices based on other non-volatile storage techniques.

EXAMPLE IMPLEMENTATION TECHNIQUES

In some embodiments, various combinations of all or portions of operations performed by an SSD controller (such as an SSD providing management of device firmware update effects as seen by a host), e.g., with flash memories, a computing-host flash memory controller, and/or an SSD controller (such as SSD controller 100 of FIG. 1A), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments some, all, or various portions of the program instructions are realized as one or more functions, routines, sub-routines, in-line routines, procedures, macros, or portions thereof.

CONCLUSION

Certain choices have been made in the description merely for convenience in preparing the text and drawings and unless there is an indication to the contrary the choices should be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit-bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines sub-routines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A storage device comprising:
   a memory;
   a host interface coupled to a computing host; and
   a storage controller communicatively coupled to the host interface and the memory, the storage controller configured to
      operate the storage device in accordance with a first firmware associated with a first firmware revision identifier,
      upon receiving a command from the computing host, return the first firmware revision identifier,
      receive a second firmware from the computing host, the second firmware associated with a second firmware revision identifier,
      activate the second firmware on the storage device, and
      upon receiving a command from the computing host, return the first firmware revision identifier to the computing host while operating the storage device in accordance with the second firmware and before an event occurs, wherein the returning the first firmware revision identifier enables the computing host to continue executing without detecting an error in response to a change in a value of a returned firmware revision identifier throughout the operation of the storage device in accordance with the first firmware and during operation of the storage device in accordance with the second firmware, wherein the event comprises at least one of a power cycle, at least a portion of the storage device transitioning from one power mode to another, the storage device receiving a vendor-specific command type, the storage device receiving a parameter and code as part of a firmware update, and a resetting of a link coupling the storage device to the computing host.

2. The storage device of claim 1, wherein the first firmware revision identifier is returned to the computing host in response to receiving a read-identity command type from the computing host.

3. The storage device of claim 2, wherein the read-identity command type comprises a Serial Advanced Technology Attachment (SATA) IDENTIFY command type.

4. The storage device of claim 2, wherein the read-identity command type comprises a Serial Attached Small Computer System Interface (Serial SCSI) (SAS) read Vital Product Data (VPD) command type.

5. The storage device of claim 1, wherein the storage controller is further configured to, upon receiving a command from the computing host, return the second firmware revision identifier to the computing host while operating the storage device in accordance with the second firmware and after the event occurs.

6. A method comprising:
   operating a storage device in accordance with a first firmware associated with a first firmware revision identifier;
   upon receiving a command from a computing host coupled to the storage device, return the first firmware revision identifier;
   receiving a second firmware from the computing host, the second firmware associated with a second firmware revision identifier;
   activating the second firmware on the storage device; and
   upon receiving a command from the computing host, returning the first firmware revision identifier to the computing host while operating the storage device in accordance with the second firmware and before an event occurs, wherein the returning the first firmware revision identifier enables the computing host to continue executing without detecting an error in response to a change in a value of a returned firmware revision identifier throughout the operation of the storage device in accordance with the first firmware and during operation of the storage device in accordance with the second firmware, wherein the event comprises at least one of a power cycle, at least a portion of the storage device transitioning from one power mode to another, the storage device receiving a vendor-specific command type, the storage device receiving a parameter and code as part of a firmware update, and a resetting of a link coupling the storage device to the computing host.

7. The method of claim 6, wherein the first firmware revision identifier is returned to the computing host in response to receiving a read-identity command type from the computing host.

8. The method of claim 7, wherein the read-identity command type comprises a Serial Advanced Technology Attachment (SATA) IDENTIFY command type.

9. The method of claim 7, wherein the read-identity command type comprises a Serial Attached Small Computer System Interface (Serial SCSI) (SAS) read Vital Product Data (VPD) command type.

10. The method of claim 6, wherein the computing host is running an unmodified version of an Operating System.

11. The method of claim 6, further comprising, upon receiving a command from the computing host, returning the second firmware revision identifier to the computing host while operating the storage device in accordance with the second firmware and after the event occurs.

12. A non-transitory computer-readable storage medium storing instructions that, when executed by a processing resource of a device, cause the processing resource to perform steps comprising:
    operating the device in accordance with a first firmware associated with a first firmware revision identifier;
    upon receiving a command from a computing host coupled to the device, return the first firmware revision identifier;
    receiving a second firmware from the computing host, the second firmware associated with a second firmware revision identifier;
    activating the second firmware on the device; and
    upon receiving a command from the computing host, returning the first firmware revision identifier to the computing host while operating the device in accordance with the second firmware and before an event occurs, wherein the returning the first firmware revision identifier enables the computing host to continue executing without detecting an error in response to a change in a value of a returned firmware revision identifier throughout the operation of the device in accordance with the first firmware and during operation of the device in accordance with the second firmware wherein the event comprises at least one of a power cycle, at least a portion of the storage device transitioning from one power mode to another, the storage device receiving a vendor-specific command type, the storage device receiving a parameter and code as part of a firmware update, and a resetting of a link coupling the storage device to the computing host.

13. The non-transitory computer-readable storage medium of claim 12, wherein the computing host is running an unmodified version of an Operating System.

14. The non-transitory computer-readable storage medium of claim 12, storing further instructions that cause the processing resource to perform steps comprising, upon receiving a command from the computing host, returning the second firmware revision identifier to the computing host while operating the device in accordance with the second firmware and after the event occurs.

* * * * *